United States Patent
Gu et al.

(10) Patent No.: US 11,175,764 B2
(45) Date of Patent: Nov. 16, 2021

(54) TOUCH DISPLAY DEVICE

(71) Applicant: BOE Technology Group Co., Ltd., Beijing (CN)

(72) Inventors: Penghao Gu, Beijing (CN); Paoming Tsai, Beijing (CN); Peng Cai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/862,975

(22) Filed: Apr. 30, 2020

(65) Prior Publication Data
US 2021/0157431 A1    May 27, 2021

(30) Foreign Application Priority Data

Nov. 27, 2019   (CN) .......................... 201911185420.0

(51) Int. Cl.
*G06F 1/16*    (2006.01)
*G06F 3/041*    (2006.01)

(52) U.S. Cl.
CPC .......... *G06F 3/0412* (2013.01); *G06F 1/1601* (2013.01); *G06F 1/1652* (2013.01); *G06F 2203/04102* (2013.01)

(58) Field of Classification Search
CPC .... G06F 3/0412; G06F 1/1601; G06F 1/1652; G06F 2203/04102
See application file for complete search history.

(56) References Cited

U.S. PATENT DOCUMENTS

| | | | |
|---|---|---|---|
| 2013/0329460 A1* | 12/2013 | Mathew | G06F 1/1616 362/612 |
| 2016/0079329 A1* | 3/2016 | Lee | G06F 1/1643 257/40 |
| 2017/0271616 A1 | 9/2017 | Choi et al. | |
| 2018/0061893 A1* | 3/2018 | Breedlove | H01L 27/322 |

(Continued)

FOREIGN PATENT DOCUMENTS

| | | |
|---|---|---|
| CN | 106228910 A | 12/2016 |
| CN | 106847870 A | 6/2017 |

(Continued)

OTHER PUBLICATIONS

Office Action for corresponding Chinese Application 201911185420.0 dated Mar. 3, 2021.

*Primary Examiner* — Ryan A Lubit
(74) *Attorney, Agent, or Firm* — Arent Fox LLP; Michael Fainberg (57) ABSTRACT

The present disclosure relates to a touch display device including a display panel and a support structure. The display panel includes a display portion, a bent portion and a fixed portion. The bent portion is located between the display portion and the fixed portion, and the fixed portion is bent, through the bent portion, to a back side of the display portion. The support structure includes a first protective layer and a second protective layer oppositely arranged and located between the display portion and the fixed portion, a support layer located between the first protective layer and the second protective layer, and an adhesive layer located between the support layer and the second protective layer. The adhesive layer is provided with a structure configured to disperse stress generated by the display panel during bending.

11 Claims, 4 Drawing Sheets

(56) References Cited

U.S. PATENT DOCUMENTS

| | | | |
|---|---|---|---|
| 2018/0062094 A1 | 3/2018 | Kwon et al. | |
| 2018/0375040 A1 | 12/2018 | Li | |
| 2019/0101784 A1* | 4/2019 | Shin | G06F 1/1652 |
| 2019/0165311 A1 | 5/2019 | Lee | |
| 2019/0213925 A1* | 7/2019 | Ha | G06F 3/03547 |
| 2020/0006683 A1* | 1/2020 | Kim | B32B 7/12 |
| 2020/0136066 A1* | 4/2020 | Jin | H01L 27/323 |
| 2020/0413551 A1 | 12/2020 | Du | |

FOREIGN PATENT DOCUMENTS

| | | |
|---|---|---|
| CN | 107221606 A | 9/2017 |
| CN | 109135593 A | 1/2019 |
| CN | 109473046 A | 3/2019 |
| CN | 110009996 A | 7/2019 |
| CN | 209103266 U | 7/2019 |
| CN | 110265580 A | 9/2019 |

\* cited by examiner

TOUCH DISPLAY DEVICE

The present application claims the benefit of the Chinese patent application No. 201911185420.0, filed with the Chinese Patent Office on Nov. 27, 2019, the content of which is incorporated by reference herein in its entirety.

FIELD

The present disclosure relates to the technical field of display, in particular to a touch display device.

BACKGROUND

Organic Light Emitting Diode (OLED) display devices have gradually become the first choice for screens, have many advantages such as self-luminosity, high luminous efficiency, short response time, and high definition and contrast, and can further ensure that the screens have a certain flexibility and adaptability. With the development of flexible display screens, people have higher and higher expectations for foldable display products.

At present, film layers of a flexible display screen usually has film layer structures such as a cover plate, a module functional film layer, a light-emitting film layer, a backplane film layer, a flexible substrate and a back support film. For narrow bezel design and appearance assembly, circuit areas and components such as Chip On Films (COF) and Flexible Printed Circuits (FPC) need to be bent. The circuit areas and components are bent to the backs of faceplates for achieving the appearance design. Therefore, the bending of the circuit areas is already a very proven technique.

SUMMARY

An embodiment of the present disclosure provides a touch display device which includes a display panel and a support structure.

The display panel includes a display portion, a bent portion and a fixed portion. The bent portion is located between the display portion and the fixed portion, and the fixed portion is bent, through the bent portion, to one side of the display portion facing a first protective layer. The support structure includes: the first protective layer and a second protective layer oppositely arranged and located between the display portion and the fixed portion, a support layer located between the first protective layer and the second protective layer, and an adhesive layer located between the support layer and the second protective layer. The first protective layer contacts with the display portion, and the second protective layer partially contacts with the fixed portion.

The adhesive layer is provided with a structure configured to disperse stress generated by the display panel during bending.

Optionally, in a specific implementation, in the touch display device provided by embodiments of the present disclosure, the adhesive layer includes a first adhesive layer, a first base layer and a second adhesive layer which are stacked; the first adhesive layer contacts with the support layer; and the second adhesive layer contacts with the second protective layer.

Optionally, in a specific implementation, in the touch display device provided by embodiments of the present disclosure, the adhesive layer includes a plurality of strip-shaped adhesive structures arranged at intervals.

Optionally, in a specific implementation, in the touch display device provided by embodiments of the present disclosure, an extension direction of the plurality of strip-shaped adhesive structures is the same as a direction of a bending axis of the bent portion, and the arrangement direction of the plurality of the strip-shaped adhesive structures is perpendicular to the direction of the bending axis of the bent portion.

Optionally, in a specific implementation, in the touch display device provided by embodiments of the present disclosure, a gap is formed between every two adjacent strip-shaped adhesive structures, and each strip-shaped adhesive structure and one adjacent gap form a repetitive structure.

The widths of the respective repetitive structures are the same and the widths of the respective strip-shaped adhesive structures are the same in the direction gradually away from the bent portion.

Optionally, in a specific implementation, in the touch display device provided by embodiments of the present disclosure, a gap is formed between every two adjacent strip-shaped adhesive structures, and each strip-shaped adhesive structure and one adjacent gap form a repetitive structure;

The widths of the respective repetitive structures are the same and the widths of the respective strip-shaped adhesive structures gradually increase in a direction gradually away from the bent portion.

Optionally, in a specific implementation, in the touch display device provided by embodiments of the present disclosure, the modulus of the first adhesive layer is smaller than the modulus of the second adhesive layer.

Optionally, in a specific implementation, in the touch display device provided by embodiments of the present disclosure, the modulus of the first adhesive layer is 1 Kpa to 200 Kpa, and the modulus of the second adhesive layer is 200 Kpa to 400 Kpa.

Optionally, in a specific implementation, in the touch display device provided by embodiments of the present disclosure, the modulus of the first base layer is 3 Gpa to 10 Gpa.

Optionally, in a specific implementation, in the touch display device provided by embodiments of the present disclosure, the adhesive layer further includes a second base layer located between the first base layer and the second adhesive layer;

The thickness of the second base layer gradually increases in the direction gradually away from the bent portion.

Optionally, in a specific implementation, in the touch display device provided by embodiments of the present disclosure, a surface of the second base layer contacting with the first base layer is a first surface, a surface of the second base layer contacting with the second adhesive layer is a second surface, and an included angle between the first surface and the second surface is 10° to 30°.

Optionally, in a specific implementation, in the touch display device provided by embodiments of the present disclosure, the second base layer is made of thermoplastic polyimide or thermoplastic polyurethane elastomer rubber.

Optionally, in a specific implementation, in the touch display device provided by embodiments of the present disclosure, the second base layer is formed by hot-pressing the thermoplastic polyimide or thermoplastic polyurethane elastomer rubber at 200° C. to 300° C. for 10 s to 15 s.

DETAILED DESCRIPTION OF THE EMBODIMENTS

In order to make the purposes, technical solutions and advantages of the present disclosure more clear, a touch display device provided by embodiments of the present disclosure will be described in further detail below with reference to the drawings. Obviously, the described embodiments are only a part of embodiments of the present disclosure, but not all embodiments. All other embodiments obtained by those of ordinary skilled in the art without making creative efforts based on the embodiments in the present disclosure fall within the protection scope of the present disclosure.

The shape and size of respective film layers in the drawings do not reflect the true scale of the touch display device, and only partial structures of the touch display device are shown for the only purpose of illustrating the content of the present disclosure.

Figure 1:
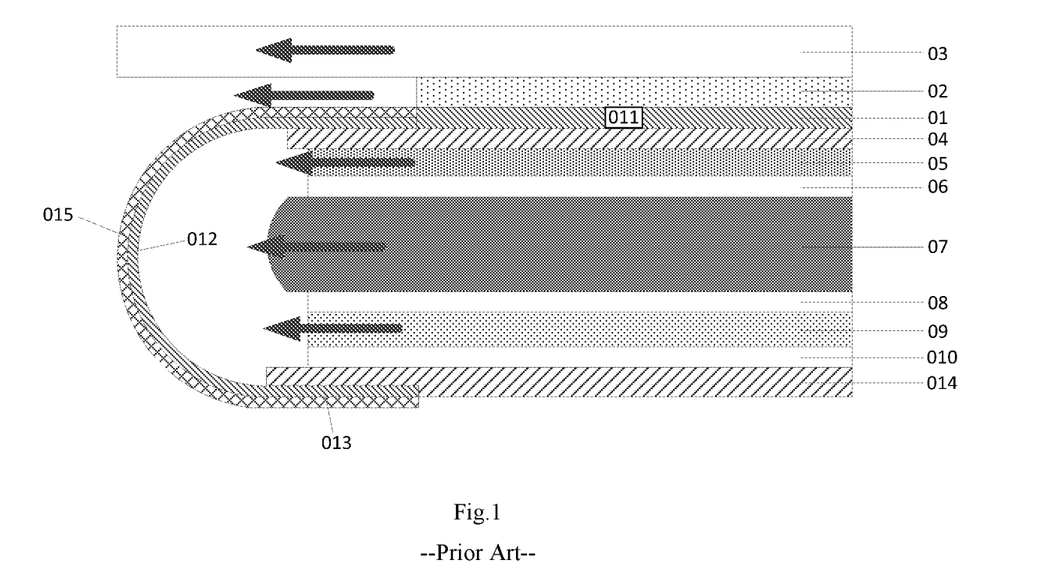
FIG. 1 is a first schematic diagram of a cross-sectional structure of a touch display device in the related art.
Figure 2:
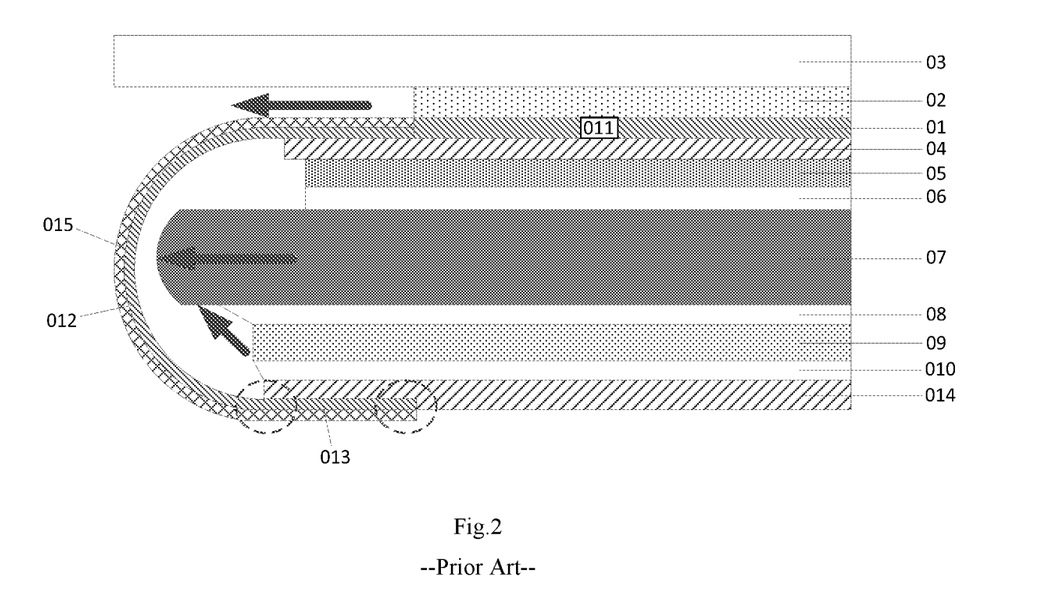
FIG. 2 is a second schematic diagram of a cross-sectional structure of a touch display device in the related art.

At present, with the development of folding products, many module materials have gradually appeared as well, such as some metal supports which may achieve the effects of supporting and heat dissipation. For example, according to a structure of a touch display device in the related art, shown in FIG. 1, a display panel 01 and a touch panel 02 of the touch display device in an active area (AA) are fit together by an adhesive layer, and one side of the touch panel 02 away from the display panel 01 further includes a cover plate 03. The display panel 01 includes a flat display portion 011, a bent portion 012, and a fixed portion 013, the bent portion 012 is located between the display portion 011 and the fixed portion 013, and the fixed portion 013 is bent to one side of the display portion 011 away from the touch panel 02 through the bent portion 012; the touch display device further includes a support structure; and the support structure includes a back film 04, a support member 05, a glue layer 06, a support layer 07, a glue layer 08, a substrate 09, a glue layer 010 and a back film 014 which are sequentially stacked and located between the display portion 011 and the fixed portion 013. When the bent portion 012 of the display panel is bent, since an outer side of the bent portion 012 is coated with a MCL glue layer 015 through a glue application device, a neutral layer is a circuit area wiring layer, and wire breakage does not occur when the bent portion 012 is bent. However, with the occurrence of the bending action, a panel is in an outer position during outward-bending, meanwhile, due to the effect of bending, all film layers in the panel in a circuit bending area are misaligned to different extents and expanded and extended to the two sides due to bending and stretching (as shown by arrows in FIG. 1); as shown in FIG. 2, since the support layer 07 is not fit to other layers by the whole surface, the support layer 07 is more likely to be misaligned and slip, as a result, the support layer 07 is severely misaligned, once the support layer 07 is misaligned and moved and encounters circuit lines of the bent portion 012, the circuit lines of the bent portion 012 may be bumped; meanwhile, since glue of the glue layer 08 and the glue layer 010 are hard, misalignment force generated by the support layer 07 will be abruptly and directly transmitted to the back film 014, and further transmitted to the circuit lines on the fixed portion 013; and the circuit lines on the fixed portion 013 are further pulled by the misalignment force, then the positions where the fixed portion 013 and the back film 014 are overlapped and fixed are stress concentration positions (dotted circle positions in FIG. 2), the circuit lines on the fixed portion 013 are pulled by stress, and therefore the risk of deformation or even breakage of the circuit lines is caused.

In view of this, embodiments of the present disclosure provide a touch display device, as shown in FIGS. 6-9, the touch display device includes a display panel 1 and a support structure.

The display panel 1 includes a display portion 11, a bent portion 12 and a fixed portion 13, the bent portion 12 is located between the display portion 11 and the fixed portion 13, and the fixed portion 13 is bent, through the bent portion 12, to one side of the display portion 11 facing a first protective layer 2;

The support structure includes: the first protective layer 2 and a second protective layer 3 oppositely arranged and located between the display portion 11 and the fixed portion 13, a support layer 4 located between the first protective layer 2 and the second protective layer 3, and an adhesive layer 5 located between the support layer 4 and the second protective layer 3; the first protective layer 2 contacts with the display portion 11, and the second protective layer 3 partially contacts with the fixed portion 13;

The adhesive layer 5 is provided with a structure configured to disperse stress generated by the display panel 1 during bending.

The touch display device provided by the embodiments of the present disclosure includes a display panel 1 and a support structure; the adhesive layer 5 in the support structure layer is provided with a structure configured to disperse stress generated by the display panel during bending. When the display panel is bent, all components in the display panel are misaligned to different extents and extended to the two sides due to bending and stretching, therefore, misalignment force, namely stress is generated, the stress is transmitted to a circuit area through the adhesive layer 5, thus, the positions where the adhesive layer 5 and the fixed portion 13 are fixed become stress concentration positions, circuit lines of the circuit area are pulled by concentrated stress, and therefore the risk of deformation or even breakage of the circuit lines of the circuit area is caused. In the present disclosure, the adhesive layer 5 is provided with the structure configured to disperse stress generated by the display panel during bending, thus, the stress generated during bending of the display panel will be dispersed and weakened without causing the stress to be concentrated at the positions where the adhesive layer 5 and the fixed portion 13 are fixed the whole time, and accordingly the problem of deformation or even breakage of the circuit lines of the circuit area is reduced.

Figure 3:
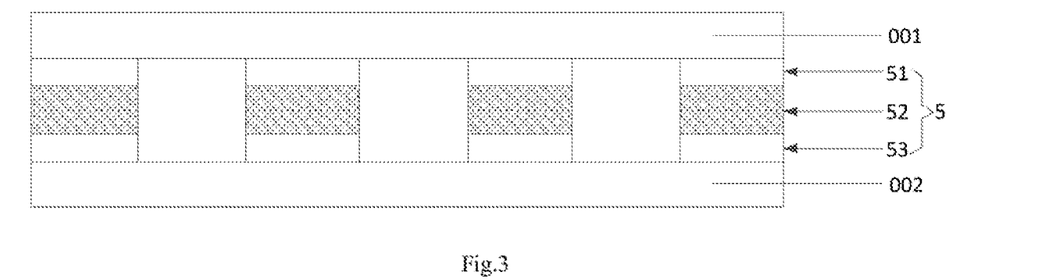
FIG. 3 is a schematic structural diagram of an adhesive layer in a touch display device provided by an embodiment of the present disclosure.
Figure 4:
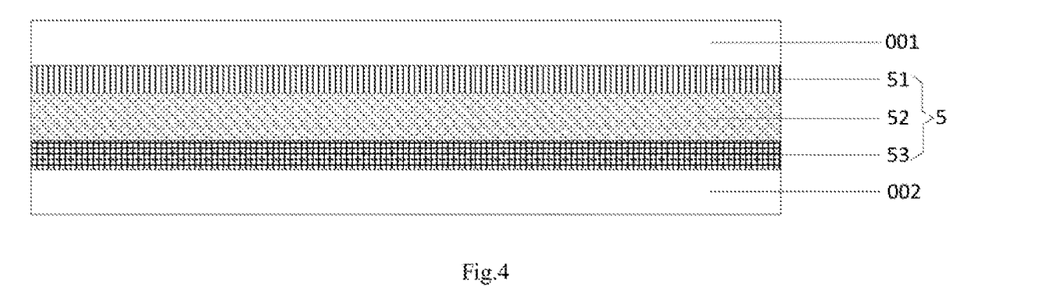
FIG. 4 is a schematic structural diagram of another adhesive layer in a touch display device provided by an embodiment of the present disclosure.
Figure 5:
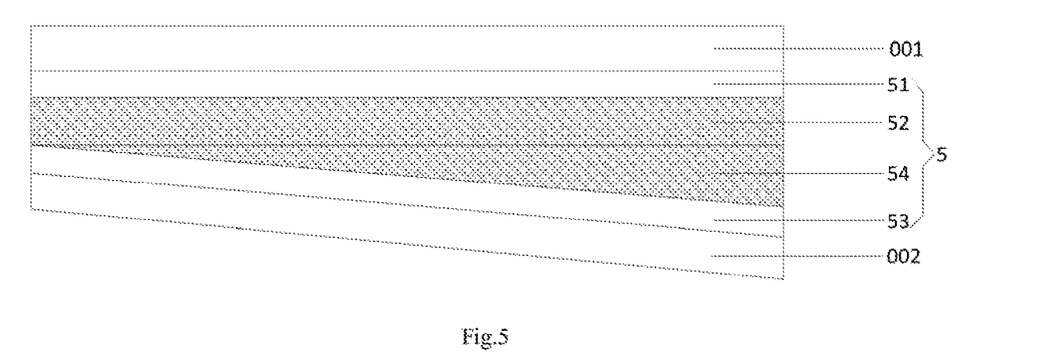
FIG. 5 is a schematic structural diagram of yet another adhesive layer in a touch display device provided by an embodiment of the present disclosure.

Optionally, in the touch display device provided by the embodiments of the present disclosure, as shown in FIGS. 3-5, the adhesive layer 5 includes a first adhesive layer 51, a first base layer 52 and a second adhesive layer 53 which are stacked; the first adhesive layer 51 contacts with the support layer 4; and the second adhesive layer 53 contacts with the second protective layer 3. Specifically, the adhesive layer 5 is provided with the structure configured to disperse the stress generated by the display panel during bending, the stress generated during bending of the display panel will be dispersed and weakened without causing the stress to be concentrated at the positions where the adhesive layer 5 and the fixed portion 13 are fixed the whole time, and accordingly the problem of deformation or even breakage of the circuit lines of the circuit area is reduced.

Optionally, as shown in FIGS. 3-5, the outer side of the first adhesive layer 51 is further provided with a light release film 001, the outer side of the second adhesive layer 53 is further provided with a heavy release film 002, the adhesive layer 5 is generally made of an optical adhesive, therefore, both the upper and lower layers of release films are made of optical release films to be matched with the adhesive layer 5. When the adhesive layer 5 is configured to connect the circuit area, bent to the back of the display panel, and the support layer 4, that is, connect the support layer 4 and the second protective layer 3 in the support structure, the light release film 001 and the heavy release film 002 need to be torn off.

Optionally, the first base layer 52 may be made of a polyethylene terephthalate (PET) or polyimide (PI) substrate.

Figure 6:
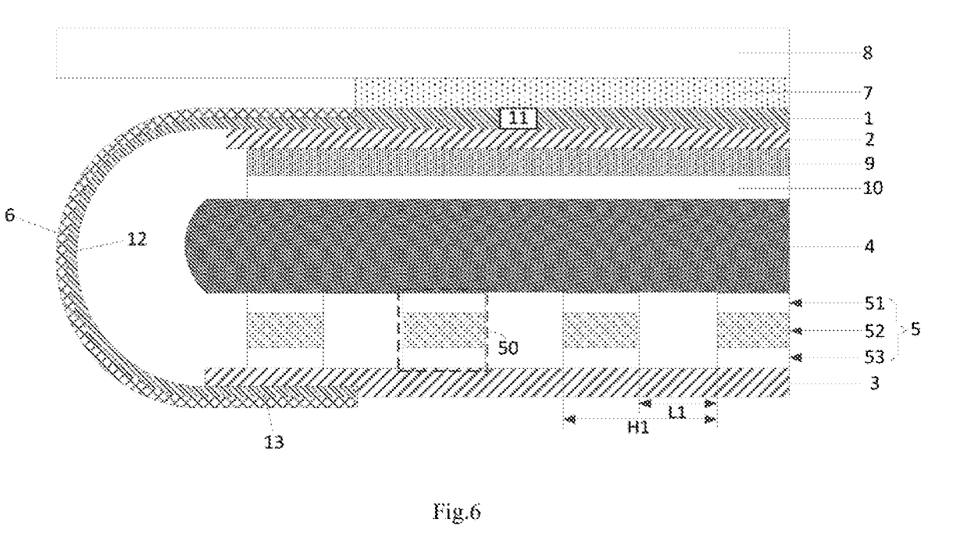
FIG. 6 is a schematic diagram of a cross-sectional structure of a touch display device provided by an embodiment of the present disclosure.
Figure 7:
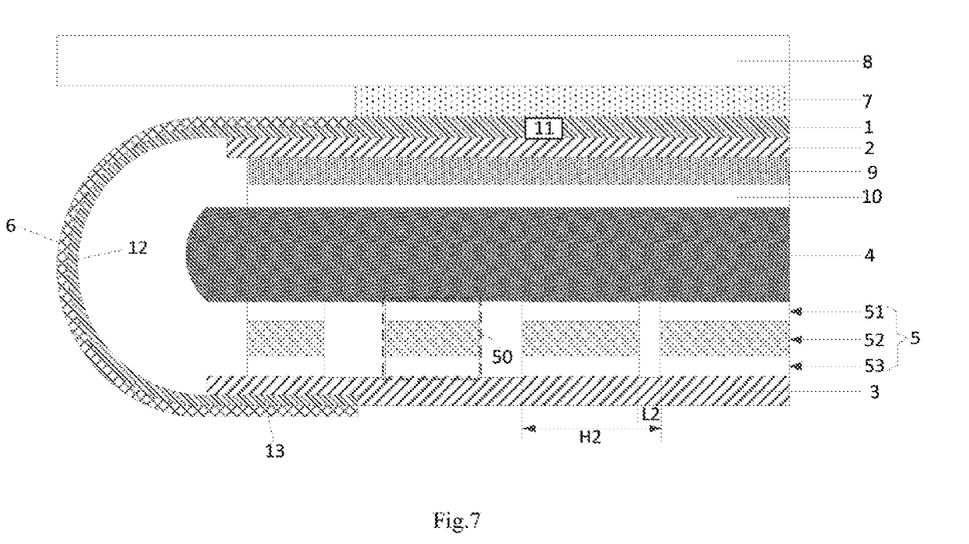
FIG. 7 is a schematic diagram of a cross-sectional structure of another touch display device provided by an embodiment of the present disclosure.

Optionally, in the touch display device provided by the embodiments of the present disclosure, as shown in FIG. 3, FIG. 6 and FIG. 7, the adhesive layer 5 includes a plurality of strip-shaped adhesive structures 50 arranged at intervals. In the present disclosure, the adhesive layer 5 is arranged as the plurality of strip-shaped adhesive structures 50 arranged at intervals, when the display panel 1 is bent, stress generated by misalignment of the support layer 4 is transmitted to the adhesive layer 5, and the stress transmitted to the adhesive layer 5 is weakened in stages by the strip-shaped adhesive structures 50 arranged at intervals, so that the stress transmitted to the positions where the adhesive layer 5 and the fixed portion 13 are fixed is greatly reduced without causing the stress to be concentrated at the positions where the adhesive layer 5 and the fixed portion 13 are fixed, accordingly, the problem of deformation or even breakage of the circuit lines of the circuit area is avoided, and the circuit line stability in the circuit area is improved.

Optionally, in the touch display device provided by the embodiments of the present disclosure, as shown in FIG. 3, FIG. 6 and FIG. 7, when the display panel is bent along a bending axis, generated stress is perpendicular to an extension direction of the bending axis, therefore, in order to effectively weaken the stress generated during bending, the extension direction of the plurality of strip-shaped adhesive structures 50 is the same as the direction of the bending axis of the bent portion 12 (taking FIGS. 6 and 7 as an example, the direction of the bending axis is the direction perpendicular to the paper), and an arrangement direction of the plurality of strip-shaped adhesive structures 50 is perpendicular to the direction of the bending axis of the bent portion 12. In this way, the stress can be weakened to the greatest extent. Certainly, in some implementations, the extension direction of the plurality of strip-shaped adhesive structures 50 may also be perpendicular to the direction of the bending axis of the bent portion 12, and the arrangement direction of the plurality of strip-shaped adhesive structures 50 is the same as the direction of the bending axis of the bent portion 12, which also fall within the protection scope of the present disclosure.

Optionally, in the touch display device provided by the embodiments of the present disclosure, as shown in FIG. 6, a gap L1 is formed between every two adjacent strip-shaped adhesive structures 50, and each strip-shaped adhesive structure 50 and one adjacent gap L1 form a repetitive structure H1;

In order to simplify a manufacturing process, the widths of the respective repetitive structures H1 are the same and the widths of the respective strip-shaped adhesive structures 50 are the same in the direction gradually away from the bent portion 12, so that the process of manufacturing the respective strip-shaped adhesive structures 50 is uniform, and manufacturing is convenient.

Optionally, in the touch display device provided by the embodiments of the present disclosure, as shown in FIG. 7, a gap L2 is formed between every two adjacent strip-shaped adhesive structures 50, and each strip-shaped adhesive structure 50 and one adjacent gap L2 form a repetitive structure H2;

Since the stress is mainly concentrated at the positions where the fixed portion 13 overlaps with the second protective layer 3, and the overlapping positions are close to the bent portion 12, in order to more effectively weaken the stress, the widths of the respective repetitive structures H2 are the same and the widths of the respective strip-shaped adhesive structures 50 gradually increases in the direction gradually away from the bent portion 12, so that the widths of the gaps L2 close to the bent portion 12 are relatively wide, and transmission of the stress can be blocked more effectively.

Figure 8:
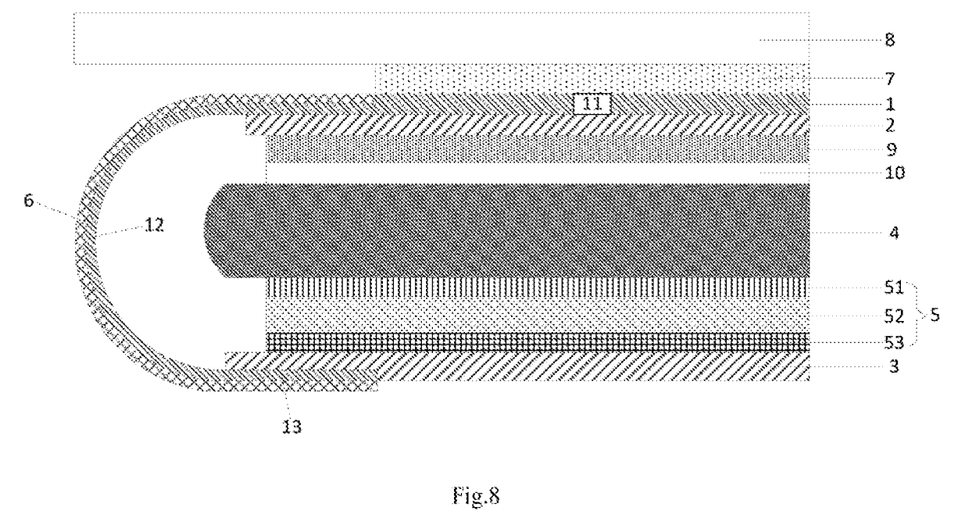
FIG. 8 is a schematic diagram of a cross-sectional structure of further another touch display device provided by an embodiment of the present disclosure.

Optionally, in the touch display device provided by the embodiments of the present disclosure, as shown in FIG. 4 and FIG. 8, since it is difficult to avoid misalignment of various components when the display panel is bent, in addition, a modulus of glue materials adopted in the prior art is high, that is, glue layers in the prior art are relatively hard, the hard glue layers are liable to pull circuit lines of the circuit area and cannot consume stress generated by misalignment, therefore, in order to further weaken pulling on the circuit lines of the circuit area and consume energy generated by misalignment, the modulus of the first adhesive layer 51 is smaller than the modulus of the second adhesive layer 53 in the embodiment of the present disclosure. Optionally, the greater the modulus of the glue material is, the harder the glue material is, and more difficult the glue material is to deform; conversely, the smaller the modulus of the glue material is, the softer the glue material is, and easier the glue material is to deform; since the first adhesive layer 51 is close to the support layer 4, the stress generated by misalignment of the support layer 4 is transmitted to the first adhesive layer 51 and then to a circuit wiring area, by adopting the first adhesive layer 51 with a smaller modulus in the present disclosure, the hardness of the first adhesive layer 51 is lower than that of the second adhesive layer 53, the first adhesive layer 51 with a lower hardness can further weaken pulling to circuit lines of the circuit area and increase deformation of the adhesive layer to consume stress and concentration generated by misalignment of the support layer 4, and the stress is consumed; and the second adhesive layer 53 is fixed to the fixed portion 13 through the second protective layer 3, the second adhesive layer 53 is made of a glue material with a large modulus, deformation of the second adhesive layer 53 can be reduced, in addition, the second adhesive layer 53 does not generate large shear force, therefore, the second adhesive layer 53 with small deformation will cause small deformation borne by the second protective layer 3 and the circuit lines of the circuit area, then pulling and deformation of the circuit lines of the circuit area are further reduced, the stability of the bonding positions of the second protective layer 3 and the fixed portion 13 is ensured, and therefore the reliability of a circuit bent area during bending is improved.

Optionally, in the touch display device provided by the embodiments of the present disclosure, as shown in FIG. 4 and FIG. 8, the modulus of the first adhesive layer 51 may be 1 Kpa to 200 Kpa, and the modulus of the second adhesive layer 53 is 200 Kpa to 400 Kpa. By reasonably setting of the modulus of the first adhesive layer 51 and the second adhesive layer 53, on the basis of ensuring that the second protective layer 3 and the circuit lines of the circuit area are less deformed, pulling of the stress caused by bending of the display panel to the circuit lines of the circuit area can be weakened, energy of the stress caused by misalignment can be consumed, the stability of the circuit lines of the circuit area is improved, and the device performance is optimized.

Optionally, in the touch display device provided by the embodiments of the present disclosure, as shown in FIG. 4 and FIG. 8, in order to further reduce deformation of the side where the adhesive layer 5 and fixed portion 13 lines are glued, the modulus of the first base layer 52 may be 3 Gpa to 10 Gpa. In this way, the first base layer 52 also adopts a material with a large modulus, such as a polyimide base material, the first base layer 52 is large in modulus and is not prone to being deformed, and thus more stress generated by misalignment can be further consumed.

The touch display device shown in FIG. 3, FIG. 4, FIG. 6, FIG. 7 and FIG. 8 are all configured to solve the problem that circuit lines of the circuit area are pulled or even broken mainly due to large misalignment of the support layer when the display panel is bent. In addition, due to the bending, the bent portion 12 expanding and extending in a circuit bent area also severely squeezes the support structure at the dotted circles in FIG. 2, squeeze stress accumulation causes deformation at glued positions of the fixed portion 13 and the second protective layer 3, stress accumulated at the positions are not likely to be evacuated at the positions, and then the circuit lines of the fixed portion 13 are liable to be broken. Therefore, in order to further optimize and reduce accumulation of stress or extension deformation stress, in some implementations, in the touch display device provided by the embodiments of the present disclosure, as shown in FIG. 5 and FIG. 9, the adhesive layer 5 further includes a second base layer 54 located between the first base layer 52 and the second adhesive layer 53;

The thickness of the second base layer 54 gradually increases in the direction gradually away from the bent portion 12. Optionally, the second base layer 54 in the present disclosure adopts a slope structure design, so that the second protective layer 3 gradually slopes to the side away from the first base layer 52 relative to the first base layer 52, and when the display panel is bent, the fixed portion 13 also gradually slopes to the side away from the first base layer 52, so that the direction of stress F1 generated when the bent portion 12 squeezes the support structure during bending is the same as the extension direction of the second protective layer 3, F1 can be decomposed into a horizontal force F2 and a vertical force F3, both F2 and F3 are less than F1, thus, the horizontal component force F2 can be reduced, concentration and accumulation of the horizontal stress are reduced, the horizontal stress is evacuated and dredged to a certain extent, and the risk of breakage of the circuit lines of the fixed portion 13 is lowered.

Figure 9:
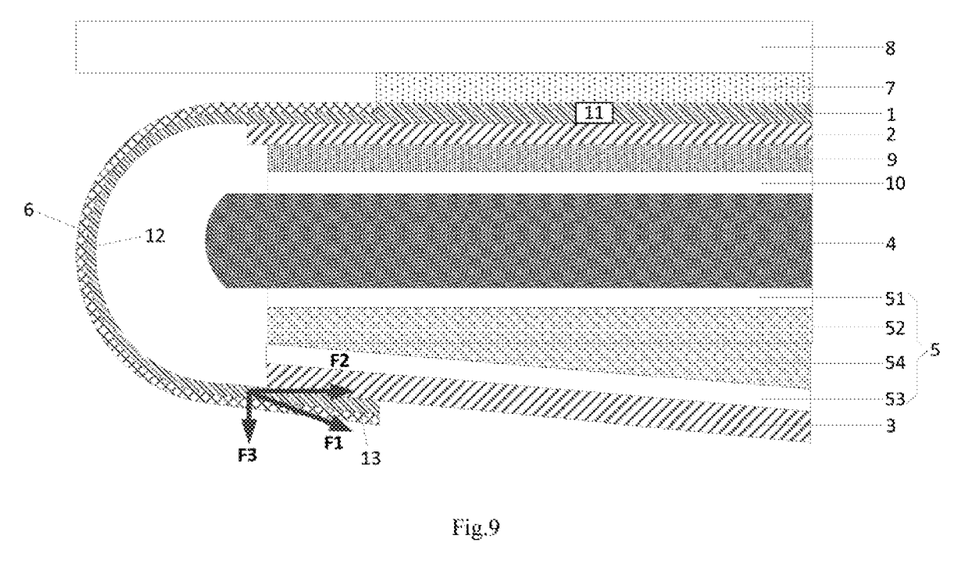
FIG. 9 is a schematic diagram of a cross-sectional structure of yet another touch display device provided by an embodiment of the present disclosure.

Optionally, in order to ensure that the horizontal stress is reduced without affecting the stability of the device, in the touch display device provided by the embodiments of the present disclosure, as shown in FIG. 5 and FIG. 9, the surface of the second base layer 54 contacting with the first base layer 52 is a first surface, the surface of the second base layer 54 contacting with the second adhesive layer 53 is a second surface, and an included angle between the first surface and the second surface is 10° to 30°.

Optionally, in the touch display device provided by the embodiments of the present disclosure, the second base layer 54 may be made of thermoplastic polyimide or thermoplastic polyurethane elastomer rubber. The second base layer is simple, inexpensive and easy to manufacture through the thermoplastic polyimide or thermoplastic polyurethane elastomer rubber.

Optionally, in the touch display device provided by the embodiments of the present disclosure, the second base layer is formed by hot-pressing the thermoplastic polyimide or thermoplastic polyurethane elastomer rubber at 200° C. to 300° C. for 10 s to 15 s.

It should be noted that the technical solutions of FIGS. 3 to 9 provided by the embodiments of the present disclosure can be combined with each other when possible to achieve a better effect.

Optionally, in the touch display device provided by the embodiments of the present disclosure, as shown in FIGS. 6 to 9, the touch display device further includes a support protective layer 6 covering the bent portion 12 and the fixed portion 13. Since circuit lines electrically connected with a display module in the display panel of the touch display device provided by the present disclosure are bent, in order to keep the circuit lines be at the neutral layer position in the bending process without line breakage, the support protective layer 6 covering the circuit lines need to be arranged on the circuit lines on the bent portion 12 and the fixed portion 13, thus, subsequent processes can be prevented from damaging the circuit lines, and the circuit lines can further be kept at the neutral layer position in the bending process by adjusting a thickness of the support protective layer 6.

Optionally, the support protective layer may be made of a material with good bending performance, such as PET, PI and COP.

Optionally, in the touch display device provided by the embodiments of the present disclosure, as shown in FIGS. 6 to 9, the touch display device further includes a touch panel 7 located on the display side of the display panel, and a cover plate 8 located on one side of the touch panel 7 away from the display panel, and further includes: a support member 9 located between the support layer 4 and the first protective layer 2, and a glue layer 10 located between the support member 9 and the support layer 4, and these film layers are the same as those in the related art and are not detailed here.

In specific implementations, the touch display device provided by the embodiments of the present disclosure further includes other functional film layers well known to those skilled in the art, which are not described in detail here.

In specific implementations, the touch display device provided by the embodiments of the present disclosure may be any product or component with a display function, such as a mobile phone, a tablet computer, a television, a display, a notebook computer, a digital photo frame and a navigator. Other indispensable components of the touch display device should be understood by those of ordinary skilled in the art, and will not be repeated here, nor should be used as a limitation to the present disclosure. Implementation of the display device may refer to the embodiments of the touch display device, and the repetition is not detailed here.

The touch display device provided by the embodiments of the present disclosure includes: the display panel and the support structure; the adhesive layer in the support structure is provided with the structure configured to disperse stress generated by the display panel during bending. When the display panel is bent, all components in the display panel are misaligned to different extents and extended to the two sides due to bending and stretching, therefore, misalignment force, namely stress is generated, the stress is transmitted to a circuit area through the adhesive layer, thus, the positions where the adhesive layer and the circuit area are fixed become stress concentration positions, circuit lines of the circuit area are pulled by concentrated stress, and therefore the risk of deformation or even breakage of the circuit lines of the circuit area is caused. In the present disclosure, the adhesive layer is provided with the structure configured to disperse stress generated by the display panel during bending, thus, the stress generated during bending of the display panel will be dispersed and weakened without causing the stress to be concentrated at the positions where the adhesive layer and the circuit area are fixed, and accordingly the problem of deformation or even breakage of the circuit lines of the circuit area is reduced.

Obviously, those skilled in the art can make various modifications and variations to the present disclosure without departing from the spirit and scope of the present disclosure. In this way, if these modifications and variations of the present disclosure fall within the scope of the claims of the present disclosure and equivalent technologies thereof, the present disclosure is also intended to include these modifications and variations.

What is claimed is:

1. A touch display device, comprising:
    a display panel; and
    a support structure;
    wherein the display panel comprises:
        a display portion;
        a bent portion; and
        a fixed portion;
        wherein the bent portion is located between the display portion and the fixed portion, and the fixed portion is bent, through the bent portion, to one side of the display portion facing a first protective layer;
    wherein the support structure comprises:
        the first protective layer;
        a second protective layer;
        a support layer located between the first protective layer and the second protective layer; and
        an adhesive layer located between the support layer and the second protective layer;
        wherein the first protective layer and the second protective layer are oppositely arranged and located between the display portion and the fixed portion; the first protective layer contacts with the display portion; the second protective layer partially contacts with the fixed portion; and the adhesive layer is provided with a structure configured to disperse stress generated by the display panel during bending; and
        wherein the adhesive layer comprises a first adhesive layer, a first base layer and a second adhesive layer which are stacked;
        the first adhesive layer contacts with the support layer;
        the second adhesive layer contacts with the second protective layer; and
        a modulus of the first adhesive layer is smaller than a modulus of the second adhesive layer.

2. The touch display device according to claim 1, wherein the adhesive layer comprises a plurality of strip-shaped adhesive structures arranged at intervals.

3. The touch display device according to claim 2, wherein an extension direction of the plurality of strip-shaped adhesive structures is same as a direction of a bending axis of the bent portion, and an arrangement direction of the plurality of strip-shaped adhesive structures is perpendicular to the direction of the bending axis of the bent portion.

4. The touch display device according to claim 3, wherein a gap is formed between every two adjacent strip-shaped adhesive structures, and each strip-shaped adhesive structure and one adjacent gap form a repetitive structure; and
    widths of the respective repetitive structures are the same and widths of the respective strip-shaped adhesive structures are the same in a direction gradually away from the bent portion.

5. The touch display device according to claim 3, wherein a gap is formed between every two adjacent strip-shaped adhesive structures, and each strip-shaped adhesive structure and one adjacent gap form a repetitive structure; and
    widths of the respective repetitive structures are the same and widths of the respective strip-shaped adhesive structures gradually increase in a direction gradually away from the bent portion.

6. The touch display device according to claim 1, wherein the modulus of the first adhesive layer ranges from 1 Kpa to 200 Kpa, and the modulus of the second adhesive layer ranges from 200 Kpa to 400 Kpa.

7. The touch display device according to claim 6, wherein a modulus of the first base layer ranges from 3 Gpa to 10 Gpa.

8. The touch display device according to claim 1, wherein the adhesive layer further comprises a second base layer located between the first base layer and the second adhesive layer; and
    a thickness of the second base layer gradually increases in a direction gradually away from the bent portion.

9. The touch display device according to claim 8, wherein a surface of the second base layer contacting with the first base layer is a first surface, a surface of the second base layer contacting with the second adhesive layer is a second surface, and an included angle between the first surface and the second surface ranges from 10° to 30°.

10. The touch display device according to claim 8, wherein the second base layer is made of thermoplastic polyimide or thermoplastic polyurethane elastomer rubber.

11. The touch display device according to claim 10, wherein the second base layer is formed by hot-pressing the thermoplastic polyimide or thermoplastic polyurethane elastomer rubber at 200° C. to 300° C. for 10 s to 15 s.

* * * * *